(12) United States Patent
Sempio et al.

(10) Patent No.: US 6,274,668 B1
(45) Date of Patent: *Aug. 14, 2001

(54) LOW VOC EMULSION

(75) Inventors: Carlo Sempio, Varese; Leo Mario Saija, Milan; Daniele Becchi, Reggio Emilia; Ezio Montessoro, Alessandria, all of (IT)

(73) Assignee: Elf Atochem Italia S.r.l. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,363

(22) Filed: Jun. 9, 2000

Related U.S. Application Data

(62) Division of application No. 08/948,237, filed on Oct. 9, 1997, now Pat. No. 6,093,675, which is a division of application No. 08/724,869, filed on Oct. 3, 1996, now Pat. No. 5,721,310.

(30) Foreign Application Priority Data

Oct. 4, 1995 (IT) .............................. MI95A2024

(51) Int. Cl.$^7$ ....................................... C08F 2/00
(52) U.S. Cl. .......................... 524/556; 526/208; 526/213
(58) Field of Search ............................ 524/556; 526/208, 526/213

(56) References Cited

U.S. PATENT DOCUMENTS

| | | | |
|---|---|---|---|
| 2,834,760 | 5/1958 | Orr et al. ............................. | 526/915 |
| 3,365,409 | 1/1968 | Lanthier ............................... | 526/915 |
| 3,438,941 | 4/1969 | Kekish ................................. | 526/915 |
| 3,862,096 | 1/1975 | Kitamura et al. . | |
| 3,898,175 | 8/1975 | Patron et al. . | |
| 3,915,941 | 10/1975 | Chan .................................... | 526/208 |
| 4,052,547 | 10/1977 | Foley et al. .......................... | 526/208 |
| 4,054,732 | 10/1977 | Schlesinger et al. ................. | 526/208 |
| 4,094,849 | 6/1978 | Oyamada et al. .................... | 525/208 |
| 4,315,089 | 2/1982 | Naarmann et al. ................... | 526/208 |
| 4,360,632 | 11/1982 | Pinschmidt, Jr. et al. ........... | 526/915 |
| 4,445,953 | 5/1984 | Hawk ................................... | 156/102 |
| 4,532,295 | 7/1985 | Brabetz et al. ...................... | 526/915 |
| 4,542,184 | 9/1985 | Eck et al. ............................. | 252/208 |
| 4,560,724 | 12/1985 | Brabetz et al. ...................... | 526/915 |
| 4,594,290 | 6/1986 | Fischer et al. ....................... | 428/212 |
| 4,617,359 | 10/1986 | Smith ................................... | 526/915 |
| 5,003,016 | 3/1991 | Boeder ................................. | 525/208 |
| 5,087,676 | 2/1992 | Heider et al. ........................ | 526/915 |
| 5,721,310 | 2/1998 | Sempio et al. ....................... | 526/915 |
| 5,744,418 | 4/1998 | Jakob ................................... | 526/915 |

FOREIGN PATENT DOCUMENTS

| | | | |
|---|---|---|---|
| 40 26 165 A1 | 3/1992 | (DE) . | |
| 93 05 850 U | 6/1993 | (DE) . | |
| 43 30 874 A1 | 3/1995 | (DE) . | |
| 0 551 867 A1 | 7/1993 | (EP) . | |
| 795514 | 5/1958 | (GB) .................................. | 526/915 |
| 1195816 | 6/1970 | (GB) .................................. | 526/208 |
| 59-157 105 | 9/1984 | (JP) ..................................... | 526/208 |

OTHER PUBLICATIONS

Hawley's Condensed Chemical Dictionary, 11$^{th}$ Edition, San et al., Feb. 12, 1991 pp. 18 and 566.

*Primary Examiner*—Bernard Lipman
(74) *Attorney, Agent, or Firm*—Finnegan, Henderson, Farabow, Garrett & Dunner, L.L.P.

(57) ABSTRACT

Process for reducing the content of residual monomers, expressed as total VOC lower than 600 ppm and deriving from the monomers utilized to obtain the emulsion lower than 100 ppm; having an amount of wet coagula lower or equal to 500 ppm after wet filtering on 125 micron filter of the emulsion at the outlet after the various dropping phases, in polymrizations and copolymerizations in dispersion or emulsion in aqueous phase based on acrylic monomers, characterized in that it comprises as redox couple the utilization of a reducing agent selected from ascorbic acid or an aldehyde having a number of carbon atoms equal to or higher than 4 and containing at least a salifiable hydrogen, organic or inorganic, or its salts and the inorganic salifiable hydrogen being added to a carboxylic group; the aldehyde reducing agent or its salts being soluble in water for at least 5% by weight, preferably 10% by weight; and from an oxidizing agent consisting of an organic hydroperoxide in aqueous solution, excluding those soluble in H$_2$O for more than 10% by weight, or its salts.

18 Claims, No Drawings

LOW VOC EMULSION

This is a division of application Ser. No. 08/948,237, filed Oct. 9, 1997, now U.S. Pat. No. 6,093,675, which was a division of U.S. Ser. No. 08/724,869 filed Oct. 3, 1996, now patented as U.S. Pat. No. 5,721,310.

The present invention relates to aqueous dispersions based on acrylic polymers and copolymers. More particularly it refers to aqueous emulsions having a low content of volatile organic compounds and of residual monomers and having low amounts of coagula.

By VOC according to the present invention it is meant the sum of the residual monomers, and besides the volatile organic compounds which are determined by the chromatographic gas method, as defined hereunder; more precisely the total VOC according to the present invention must be lower than 600 ppm and in particular the monomers, which are substances toxicologically harmful, lower than 100 ppm.

The determination of the content in VOC and in residual monomers is carried out by gaschromatographic analysis. The identification of the residual monomers is carried out by comparison with the starting monomers or by using associated techniques e.g. GC-TR or GC-Mass type.

Wet coagula according to the present invention must be lower or equal to 500 ppm after filtering on 125 $\mu$m filter the final emulsion at the outlet after the various treatment phases, as specified hereunder.

From an industrial point of view the presence of a high content in coagula implies high filtering times especially for high dry and high viscosity emulsions. The filtering process under these conditions is the critical step and leads to high productivity losses.

By acrylic polymers and copolymers according to the present invention are meant homopolymers and copolymers of the (meth)acrylic acid and/or its alkylic esters wherein the alkylic group contains from 1 to 20 carbon atoms. Examples of esters of the acrylic or methacrylic acid are: methylacrylate, ethylacrylate, isopropylacrylate, butyl (meth)acrylate, lauryl- decyl- undecyl- propyl- stearyl- (meth)acrylate, methylmethacrylate, isopropylmethacrylate, sec-butylmethacrylate, ter-butylmethacrylate, 2-ethylhexylacrylate, hydroxyalkyl(meth)acrylate with the alkyl from 2 to 5 carbon atoms, etc.

The acrylic copolymers according to the present invention can moreover contain up to 70% by weight, preferably up to 60% by weight of units derived from other monomer containing double bonds such as styrene, alpha-methylstyrene, vinylacetate, vinylpropionate and the vinylic esters of the versatic acid, acrylonitrile, (meth)acrylamide, n-alkyl or aryl maleimides, etc., or from monomers having double or triple unsaturation such as, for instance, butadiene, ethyleneglycoldi(meth)acrylate, propylenglycoldi(meth) acrylate, trimethylolpropartriacrylate, etc.

The dispersions (emulsions) of acrylic (co)polymers according to the present invention are obtained by polymerization processes in emulsion in aqueous phase. The polymerization in emulsion is usually carried out in the semi-continuous polymerization technique and comprises the following steps: starting step of the polymerization reaction, feeding step of the monomeric phase, pure or preemulsified in water, exhaustion step to reduce the residual monomers.

The starting step comprises the introduction into the reactor, equipped with stirrer and refrigerant, of a part of the charge, formed by monomers, which will form the acrylic polymer or copolymer, optionally preemulsified, water, surfactants, for instance alkyl sulphonates, sulphates, etc., and/or protective colloids, for instance polyvinylic alcohols, hydroxyalkylcellulose, etc.

The preemulsion is obtained in a preemulsifier by treating under stirring the water, the surfactants and the monomers.

The weight ratio water/monomers generally ranges between 0.3–2.

The reactor is heated at the desired temperature, generally comprised from 20° C. to 90° C. and it is added the polymerization initiator, generally a persulphoric acid salt, for instance ammonium persulphate and when the internal temperature increases up to the maximum peak, generally of the order of 1° C–20° C., the remaining part of the preemulsion (feeding step) or of the monomeric not preemulsified mixture is fed and the initiator is continued to be fed.

When the feeding is over, after about some hours, 2–10 hours of feeding at the desired temperature, a thermal stay having the duration of about 15–60 minuts is preferably carried out; then the redox treatment is carried out at the temperature indicated above or at a different temperature, preferably between about 40° and 80° C.

The most known redox couples in the art industrially utilized are formed by organic peroxidic initiators, of hydrooperoxide type, and mixed organic/inorganic reducing agents e.g. sodium formaldehyde sulphoxilate. The reaction completion carried out with these redox couples has the function to reduce the residual monomers. Among the redox couples, sodium formaldehyde sulphoxilate and ter-butylhydroperoxide are the most commonly used in industry.

This kind of couple is especially effective in particular for bringing down monomers having poor solubility in water.

According to the present invention by poor solubility in water it is meant a solubility of the monomer in water generally lower than 0.5% by weight.

These treatments allow to reduce the content of residual monomers under 100 ppm but they have the drawback to give VOC values of the order of thousands of ppm, generally 1000–2000 ppm.

The industrial processes, nowadays required, must give the lowest VOC value in order to avoid toxicologic consequences during the application or post application step of dispersions or emulsions. Nowadays industrial processes which do not cause damages from the ecological point of view, are generally requested. It can be mentioned for instance the application in the textile, adhesives, saints and varnishes field, etc. wherein emulsions are submitted to a drying step having the purpose of removing the aqueous dispersing chase and allow the formation of a polymer film.

There was therefore the need to find systems allowing to reduce the content of the total VOC in emulsions based on acrylic (co)polymers and contemporaneously to reduce the residual monomers content to values lower than 100 ppm.

It is also known in the art to carry out, before or alternatively to the redox treatment with organic couples as described above, a preliminary treatment with inorganic persulphates or inorganic redox couples, for instance persulphate/methabissulphite or hydrosulphite. This preliminary treatment has the purpose to considerably reduce the amount of monomers, and in particular it is carried out when the mixture of the monomers utilized to obtain the emulsion has good solubility in water. The treatment with compounds or redox couples of inorganic type can however result not so effective for the reduction of the monomers scarcely soluble in water, for instance styrene, butyl acrylate, etc.

The drawback of these systems generally consists in that also for short times treatments of 3 hours, the concentration of electrolytes in the emulsion increases with the risk of coagula formation, especially in case of not much protected systems, that is in systems wherein the amount of surfactants and/or protective colloids is low.

The coagula are generally higher than 500 ppm, determined as indicated above, and are of the order of 700–1000 ppm.

In this way some application characteristics of the product can be negatively influenced. Moreover it has been experimentally proved by the Applicant that these systems increase the acid group concentration on the polymer particles, sometimes causing drop in pH which can start undesired crosslinking reactions. From an industrial point of view, therefore, this treatment must be used with great caution and for short times.

Also stripping methods for removing the residual monomers and for reducing the total VOC are known in the art. The drawback of this method consists in that it can prejudice the stability of dispersions not much protected, as defined above. This is valid in particular for emulsions of polymers having high temperature glass transition (Tg), for instance higher than 10° C. The drawback of these processes is that the emulsion destabilization can cause the formation of coagula and crusts in the reactor.

The Applicant has unexpectedly and surprisingly found that it is possible to reduce the amount of the total VOC, due to the residual monomers, and to the volatile organic compounds having a boiling temperature lower than 160° C., to values lower than 600 ppm and contemporaneously to reduce the amount of the residual monomers to values lower than 100 ppm and without the formation of coagula in amounts lower than or equal to 500 ppm with the process described hereinunder.

Object of the present invention is a process to reduce the content of residual monomers, expressed as total VOC lower than 600 ppm and deriving from the monomers utilized to obtain the emulsion lower than 100 ppm; having an amount of wet coagula lower or equal to 500 ppm after wet filtering on 125 micron filter of the emulsion at the outlet after the various dropping phases, in polymerizations and copolymerizations in dispersion or emulsion in aqueous phase based on acrylic monomers, in particular homopolymers and copolymers of the (meth)acrylic acid and/or of its alkylic esters wherein the alkylic group contains from 1 to 20 carbon atoms, the content of unsaturated monomers different from the acrylic ones being capable to be up to 70% by weight, preferably up to 60% by weight, characterized in that it comprises as redox couple the utilization or a reducing agent selected from ascorbic acid or an aldehyde having a number or carbon atoms equal to or higher than 4 and containing at least a salifiable hydrogen, organic or inorganic, or its salts and the inorganic salifiable hydrogen being added to a carboxylic group; the aldehyde reducing agent or its salts being soluble in water for at least 5% by weight, preferably 10% by weight; and from an oxidizing agent consisting of an organic hydroperoxide in aqueous solution, excluding those soluble in $H_2O$ for more than 10% by weight, preferably for more than 5% by weight, or its salts.

The oxidizing and the reducing agents could be utilized also when they have a solubility in water lower than 5% by weight, for instance 2–3%. However this industrially has poor meaning as too high amounts of water are requested and therefore they could not be for instance utilized in the preparations of high dry dispersions.

Preferably according to the present invention hydroperoxides salts are utilized.

The aldehydes of the invention or the precursors of the reducing agent of the invention are illustrated by the following structure formulas which represent the inventive concept of the present invention.

Glutaraldehyde $C_5H_3O_2$

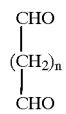

with n from 2 to 12, preferably from 3 to 6;

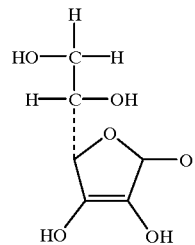

which when hydrolyzes forms an acid group.

The preferred compounds of the aldehyde reducing agent are those obtained by addition with inorganic reducing agents, preferably bisulphite. The reducing agents generally have a number of carbon atoms such that the reducing agent is soluble in water, preferably up to 20 C atoms, the chain being linear or branched, of aliphatic type; aromatic-aliphatic-aromatic and/or aromatic- aliphatic optionally containing heteroatoms in the ring, such as oxygen and nitrogen, or in the aliphatic, cycloaliphatic chain;

The reducing agent of the redox couple must respect the conditions indicated above to be included in the reducing agents of the present invention. For instance glutaraldehyde having no salifiable hydrogens does not give the results of the present invention, however when it contains acid hydrogen, such as $HSO_3$, then it gives a reducing agent which falls within the definition of the invention.

Among hydroperoxides it can be mentioned: di-isopropylbenzenedihydroproxide or its salts, generally alkaline or alkaline-earth, preferably of sodium:

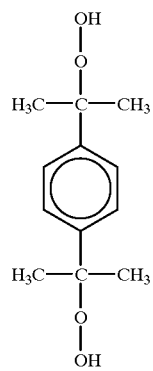

The peroxidic group can be in metha or para position, generally metha-para mixtures are available.

diisopropylbenzenemonohydroperoxide (comparative) or its salts, generally alkaline or alkaline-earth, preferably of sodium:

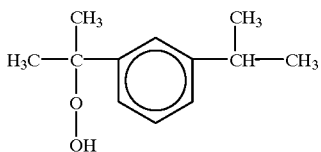

The peroxidic group can be in metha or para position, generally metha-para mixtures are available.

2,5dimethyl-2,5di(hydroproxide)hexane, commercially known as LUPERCO 2,5-2,5 (comparative) or its salts, generally alkaline or alkaline-earth, preferably of sodium:

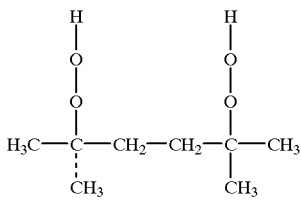

cumene hydroproxide $C_9H_{12}O$ (comparative) or its salts, generally alkaline or alkaline-earth, preferably of sodium:

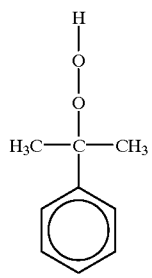

pinane hydroperoxide or its salts, generally alkaline or alkaline-earth, preferably of sodium:

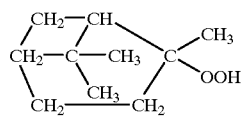

mentane hydroperoxide or its salts, generally alkaline or alkaline-earth, preferably of sodium:

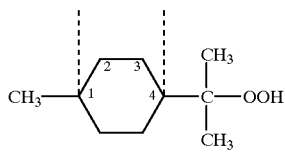

The peroxidic group can also be in 1 or 4 position; they are generally mixtures of the three isomers.

2-(4-methylphenyl)propyl-2hydroproxide or its salts, generally alkaline or alkaline-earth, preferably of sodium:

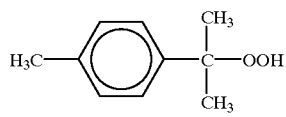

Also the oxidizing agents must respect the conditions indicated above to fall within the definition of the invention.

The VOC derived from the residual monomers by the process according to the present invention are lower than 100 ppm, preferably lower than 50, even more preferably lower than 20.

In the redox couple B), the ratio by moles between the oxidizing and the reducing agent is generally comprised from 0.25 to 4, preferably from 1 to 1.5. These are indicative values since it has been found by the Applicant that this ratio can range depending on the couples. The skilled man can easily determine the optimal ratios to obtain the desired VOC.

The amount of oxidizing agent expressed as % in equivalents on the monomers is comprised between 0.05 and 0.5, preferably between 0.1 and 0.3; the amount of reducing agent expressed as % in equivalents on the monomers is comprised between 0.025 and 0.4, preferably 0.05 and 0.2.

An alternative method according to the present invention is to directly use in the starting and/or feeding step the redox couple object of the present invention. In this case the subsequent treatment B) is not necessary. Besides, the polymerization initiator, for instance ammonium persulphate as described above, can be replaced all or partly by the redox couple of the invention.

The following examples are given for illustrative purposes but they are not limitative of the present invention.

EXAMPLE 1

Preparation of the Preemulsion

In a 10 l preemulsifier equipped with stirrer, water, surfactants and acrylic acid are added, in the amounts of TAB. 1.

After solubilization (200 rpm of the stirrer), the remaining monomers are added under stirring thus obtaining the preemulsion.

Preferably, for the whole period of the feeding, the preemulsion is kept under stirring.

Preparation of the Emulsion

An aqueous dispersion of a copolymer styrene/butyl acrylate carboxylated is prepared by utilizing the following monomeric composition (% by weight):

| | |
|---|---|
| styrene | 53% |
| butyl acrylate | 45% |
| acrylic acid | 2% |

The weight ratios styrene/butyl acrylate=1.18, styrene/acrylic acid=0.038.

In a 10 l reactor, equipped with stirrer, falling refrigerant, thermometer and inlet for nitrogen, the basic charge is introduced (Tab. 1) formed by water and surfactants (sodium laurylsulphate and nonylphenol ethoxylate mixture). The internal temperature or the reactor is brought, by thermostatic bath, to 78–79° C. and the part of preemulsion indicated in Tab. 1 is added (reaction starting).

The part of the potassium persulphate initiator solution is introduced (Tab. 1, reaction starting), and the polymerization starting is awaited. When the internal temperature reaches 83–84° C., maximum peak, one starts to feed at a constant flow-rate (Tab. 1 Feeding) the remaining part of the preemulsion and the remaining solution of initiator at a constant flow-rate (Tab. 1 feeding).

During the feeding phase the temperature inside the reactor is kept constant by means or a thermostatic bath. The duration of the feeding phase is 3 hours.

A first phase of monomeric reduction (A) with potassium persulphate (solution 4%) for a feeding time of 45' is carried out, by maintaining the constant feeding flow-rate of 2.48 g/min, and then 15' of thermal stay. Then the redox reduction phase (B) is carried out, formed by:

oxidizing agent: diisopropylbenzenedihydroperoxide sodium salt (DIP-BDHP $Na_2$) 10% weight solution, constant flow-rate of 1.88 g/min for 60 min; reducing agent: glutaraldehyde hydrogen sodium sulphite GLUT $(HSO_3Na)_2$ (indicated with $GLUTHSO_3Na$ in Tab. 2) 8% solution in water, the constant flow-rate of 1.6 g/min for 75 min.; the equivalents ratio oxidizing/reducing agent=1.35.

The redox reduction phase lasts for the set period (Tab. 1) and is followed by a phase of thermal completion C) for the time and the temperature indicated in Tab. 1. In this phase a 35% by weight solution of hydrogen peroxide is introduced (Tab. 1).

Then the emulsion is cooled and the following characterization is carried out:

| | |
|---|---|
| dry residue (1h, 105° C.) | 50% by weight |
| pH | 4.4 |
| Wet coagulum ($\mu$ 125 filter) | 450 ppm |
| residual monomers | 80 ppm |
| VOC | 500 ppm |

The polymer is formed by (% by weight): styrene 53, butyl acrylate 45, acrylic acid 2.

In Table 2 are reported in short the reduction phases with persulphate A) if present, and the residual monomers after this phase, the reduction with the redox couple B) and the thermal completion C), the total time of these combined phases and the results of the total VOC and the residual monomers.

The total VOC was determined by summing the concentration values of the residual monomers and of the products with boiling temperature lower than 160° C., both determined by gas chromatography. The quantification was carried out using the internal standard method (isobutylic alcohol) and the identification of the various peaks was carried out by comparing the retention times of each peak with those of known substances.

The chromatogram used is a FRACTOVKP 4200 with F.I.D. detector (flame ionisation detector) and by using as carrier a nitrogen 20 ml/min and packed inox columns (ID. ⅛' and length 6 feet) with 0.1% SP1000 on Carbopack-C 80–100 mesh.

The chromatographic utilizes the following method:

| Injector 160° C. Detector 200° C. | | |
|---|---|---|
| $T_1$ | 80° C. | 10 min |
| $R_1$ | 20° C./min | 2.5 min |
| $T_2$ | 130° C. | 1 min |
| $R_2$ | 4° C./min | 5 min |
| $T_3$ | 150° C. | 20 min |
| $R_3$ | 20° C./min | 1 min |
| $T_4$ | 170° C. | 10 min |
| | | 49.5 min |

The wet coagulum was determined on 125 micron filter.

TABLE 1

Amount of the prepared emulsion (g): 8000

| | WEIGHT (g) |
|---|---|
| PREEMULSION | |
| DemineraLized $H_2O$ | 800 |
| Na laurylsulphate (100%) | 48 |
| Nonylphenol ethoxylate with 20 moles of EO (ethylene oxide) (100%) | 32 |
| Butyl acrylate | 2120 |
| Styrene | 1880 |
| Acrylic acid | 80 |
| TOTAL 1 | 4960 |
| BASIC CHARGE | |
| Demineralized $H_2O$ | 2241 |
| Na laurylsulphate (100%) | 16 |
| Nonylphenol ethoxylate with 20 moles of EO (ethylene oxide) (100%) | 8 |
| INITIATOR (solution) | |
| Persulphate potassium | 16 |
| Demineralized $H_2O$ | 384 |
| REACTION STARTING | |
| TEMPERATURE: 78–79° C. | |
| PREEMULSION | 488 |
| INITIATOR | 40 |
| FEEDING | |
| TEMPERATURE: 83–45° C. | |
| PREEMULSION g/min | 24.4 |
| INITIATOR G/MIN | 2 |
| REDUCTION PHASE (with persulphate) (A) | |
| FEEDING DURATION: 45 MINUTES; | |
| Potassium persulphate 4% solution in water | 112 |
| Thermal stay: 15 minutes | |
| REDOX PHASE (B) | |
| DURATION: 75 minutes | |
| TEMPERATURE: 80–81° C. | |
| Di-isopropylbenzenedihydroperoxide sodium salt (DIPBDHP $Na_2$) 10% solutlon by weight in water in 60 min | 113 |
| Glutaraldehyde ($GLUTHSO_3Na$) bisulphite 8% solution by weight in water | 120 |
| THERMAL COMPLETION (C) | |
| DURATION: 15 MINUTES | |
| TEMPERATURE: 80–81° C. | |
| Hydrogen peroxide 35% by weight | 30 |
| COOLING | |

EXAMPLE 2

Example 1 is repeated by utilizing the following monomeric composition (% by weight):

styrene 48%, butyl acrylate 50%, acrylic acid 2% and with weight ratio styrene/butyl acrylate=0.96; acrylic acid/styrene=0.042.

In Table 2 are briefly reported the reduction phases with persulphate A), Redox B and of final thermal completion C), the time of each single phase and the total time and the concentrations of residual monomers and of the total VOC.

The obtained dispersion has the following characteristics:

| | |
|---|---|
| dry residue (1h 105° C.) | 50.3% |
| pH | 4.4 |
| wet coagulum (125 µ filter) on 8000 g | 435 ppm |
| residual monomers | 13 ppm |
| VOC | 463 ppm |

EXAMPLE 3

Example 2 is repeated by using as reducing agent of the redox couple B) the ascorbic acid (Ac. Ascorb.) in 10% by weight aqueous solution instead of glutaraldehyde hydrogen sodium sulphite with a ratio: oxidizing agent equivalents/reducing agent equivalents=2.54.

In Table 2 the single phases are reported.

The obtained dispersion has the following characteristics:

| | |
|---|---|
| dry residue (1h, 105° C.) | 50.7% |
| pH | 4.9 |
| wet coagulum (125 µ filter) | 400 ppm |
| residual monomers | 61 ppm |
| VOC | 511 ppm |

EXAMPLE 4 (comparative)

Example 2 is repeated by using as oxidizing agent of the redox couple diisopropylbenzenemonohydroperoxide (DIPBMHP) 55% solution in diisopropylbenzene (bp=210° C.) instead of DIPBDHPNa with a ratio: oxidizing agents equivalents/reducing agent equivalents=1.35.

In Table 2 the single phases are reported.

The obtained dispersion has the following characteristics:

| | |
|---|---|
| dry residue (1h, 105° C.) | 49.8% |
| pH | 2.4 |
| wet coagulum (125 µ filter | 1625 ppm |
| residual monomers | 10 ppm |
| VOC | 400 ppm |

EXAMPLE 5-(comparative)

Example 2 is repeated by using as oxidizing agent of the redox couple 2,5 dimethyl-2,5 dihydroperoxide (LUPERCO® 2,5-2,5 at 70%) in 5.7% solution in butyldiglycolacetate instead of DIPBDHP Na$_2$ with a ratio: ox. equivalents/reducing agent equivalents=1.35.

In Table 2 the single phases are reported.

The obtained dispersion has the following characteristics:

| | |
|---|---|
| dry residue (1h, 105° C.) | 49.6% |
| pH | 3.0 |
| wet coagulum (125 µ filter) | 5000 ppm |
| residual monomers | 0 ppm |
| VOC | 410 ppm |

EXAMPLE 6 (comparative)

Example 2 is repeated by using as oxidizing agent of the redox couple cumene hyroperoxide (CHP) 80% solution in cumene (bp=152° C.) instead of DIPBDHP Na$_2$ with a ratio: ox. equivalents/reducing agent equivalents=1.35.

In Table 2 the single phases are reported.

The obtained dispersion has the following characteristics:

| | |
|---|---|
| dry residue (1h, 105° C.) | 50.7% |
| pH | 3.2 |
| wet coagulum (125 µ filter) | 3125 ppm |
| residual monomers | 48 ppm |
| VOC | 873 ppm |

EXAMPLE 7 (comparative)

Example 1 is repeated by using as oxidizing agent of the redox couple t-butyl hydroperoxide (TBHP) and sodium formaldehyde sulphoxilate (FORMOPON®. The meq ratio between oxidizing and reducing agent was 2.12.

In Table 2 the single phases are reported.

The obtained dispersion has the following characteristics:

| | |
|---|---|
| dry residue (1h, 105° C.) | 49.7% |
| pH | 2.8 |
| wet coagulum (125 µ filter) | 400 ppm |
| residual monomers | 0 ppm |
| VOC | 1365 ppm |

EXAMPLE 8 (comparative)

Example 1 is repeated by using as reducing agent the methabisulphite sodium (Na$_2$S$_2$O$_5$). The meq ratio between oxidizing and reducing agent was 1.35.

In Table 2 the single phases are reported.

The obtained dispersion has the following characteristics:

| | |
|---|---|
| dry residue (1h, 105° C.) | 50.0% |
| pH | 4.7 |
| wet coagulum (125 µ filter) | 463 ppm |
| residual monomers | 231 ppm |
| VOC | 650 ppm |

EXAMPLE 9 (comparative)

Example 1 is repeated by using as reducing agent glutaraldehyde (GLUT). The meq ratio between oxidizing and reducing agent was 1.35.

In Table 2 the single phases are reported.
The obtained dispersion has the following characteristics:

| | |
|---|---|
| dry residue (1h, 105° C.) | 49.7% |
| pH | 4.9 |
| wet coagulum (125 μ filter) | 450 ppm |
| residual monomers | 710 ppm |
| VOC | 1130 ppm |

EXAMPLE 10

Example 1 is repeated by using only $K_2S_2O_3$ as oxidizing in an amount equivalent to that expected in phase A)+phase B).

In Table 2 the results are reported.
The characteristics of the emulsions are the following:

| | |
|---|---|
| dry residue (1h, 105° C.) | 50.2% by weight |
| pH | 2 |
| wet coagulum (125 μ filter) | 750 ppm |
| residual monomers | 10 ppm |
| VOC | 410 ppm |

What is claimed is:

1. A process of reducing the content of residual monomers in dispersions or emulsions obtained by polymerization or copolymerization of aqueous phase acrylic monomer, including
adding a redox couple comprising
a reducing agent selected from the group consisting of ascorbic acid or an aldehyde having four or more carbon atoms and containing at least an organic or inorganic salifiable hydrogen, or its salts, the inorganic salifiable hydrogen being added to a carboxylic group; the aldehyde reducing agent or its salts being at least 5% by weight soluble in water;
an oxidizing agent, said oxidizing agent being a salt of a hydroperoxide in aqueous solution,
the residual monomers in the dispersion or emulsion having a total VOC content lower than 600 ppm, a VOC content deriving from the monomers utilized to obtain the dispersion or emulsion lower than 100 ppm, a wet coagula content of 500 ppm or less after wet filtering on 125 micron filter of the dispersion or emulsion at the outlet after the various reduction phases.

2. The process according to claim 1, wherein the copolymer includes an additional, different monomer selected from the group consisting of styrene, alpha-methyl styrene, vinylacetate, vinylpropionate and the esters of the versatic acid, acrylonitrile, (meth)acrylamide, alkyl or aryl maleimides.

TABLE 2

| Ex. | Reduction phase A) with inorganic reducing agent | Residual monomers (ppm) | Redeox B) Ox. agent Red. agent Ox./Red. meg.8/kg | Thermal completion C) (min) | Total duration (min) | Res. Mon. (ppm) and tot. VOC (ppm) |
|---|---|---|---|---|---|---|
| 1 | $K_2S_3O_4$ $t_{feed}$ = 45 min. $t_{stay}$ = 15 min. | 5639 | DIPBDHP Na, GLUTHSO, Na Ox./red. = 1.35 t = 75 min. | t = 15 | t = 150 | Mon. = 80 VOC = 500 |
| 2 | $K_2S_3O_4$ $t_{feed}$ = 45 min. $t_{stay}$ = 15 min. | 6928 | DIPBDHP Na, GLUTHSO, Na Ox./red. = 1.35 t = 75 min. | t = 15 | t = 150 | Mon. = 13 VOC = 463 |
| 3 | $K_2S_3O_4$ $t_{feed}$ = 45 min. $t_{stay}$ = 15 min. | 6940 | DIPBDHP Na, Abscorb. Ac. Ox./red. = 2.54 t = 75 min. | t = 15 | t = 150 | Mon. = 61 VOC = 511 |
| 4* | $K_2S_3O_4$ $t_{feed}$ = 45 min. $t_{stay}$ = 15 min. | 6910 | DIPBMHP GLUTHSO, Na Ox./red. = 1.35 t = 75 min. | t = 15 | t = 150 | Mon. = 10 VOC = 460 |
| 5* | $K_2S_3O_4$ $t_{feed}$ = 45 min. $t_{stay}$ = 15 min. | 6930 | LUPERCO 2.5-2.5 GLUTHSO, Na Ox./red. = 1.35 t = 75 min. | t = 15 | t = 150 | Mon. = 0 VOC = 450 |
| 6* | $K_2S_3O_4$ $t_{feed}$ = 45 min. $t_{stay}$ = 15 min. | 6990 | LUPERCO 2.5-2.5 GLUTHSO, Na Ox./red. = 1.35 t = 75 min. | t = 15 | t = 150 | Mon. = 48 VOC = 873 |
| 7* | $K_2S_3O_4$ $t_{feed}$ = 45 min. $t_{stay}$ = 15 min. | 5700 | TBHP FORMOPON Ox./red. = 2.12 t = 75 min. | t = 15 | t = 150 | Mon. = 0 VOC = 1350 |
| 8* | $K_2S_3O_4$ $t_{feed}$ = 45 min. $t_{stay}$ = 15 min. | 5670 | DIPBDHP $Na_0$ Na, S, O, Ox./red. = 1.35 t = 75 min. | t = 15 | t = 150 | Mon. = 231 VOC = 650 |
| 9* | $K_2S_3O_4$ $t_{feed}$ = 45 min. $t_{stay}$ = 15 min. | 5660 | DIPBDHP $Na_0$ FORMOPON Ox./red. = 1.35 t = 75 min. | t = 15 | t = 150 | Mon. = 710 VOC = 1130 |
| 10* | $K_2S_3O_4$ $t_{feed}$ = 45 min. | | | t = 15 | t = 150 | Mon. = 10 VOC = 410 |

3. The process according to claim 1, wherein the copolymer includes an additional, different monomer having double unsaturation selected from the group consisting of butadiene, ethyleneglycoldi(meth)acrylate, propylenglycoldi(meth)acrylate, and trimethylolpropantriacrylate.

4. The process according to claim 1, wherein the copolymer includes at least one monomer selected from the group consisting of butyl acrylate, acrylic acid, and styrene.

5. The process according to claim 1, wherein the reducing agent is formed from an aldehyde precursor having 4 to 6 carbon atoms.

6. The process according to claim 5, wherein the reducing agent is at least 10% by weight soluble in water.

7. The process according to claim 5, wherein the reducing agent is added to an inorganic reducing agent.

8. The process according to claim 5, wherein the reducing agent is selected from the group consisting of glutaraldehyde bisulphite and ascorbic acid, and the oxidizing agent is a salt of di-isopropylbenzenedihydroperoxide.

9. The process according to claim 1, wherein the dispersion or emulsion includes at least one homopolymer or copolymer of (meth)acrylic acid or its alkylic esters wherein the alkylic group contains 1 to 20 carbon atoms.

10. The process according to claim 1, wherein the dispersion or emulsion includes up to 70% by weight additional unsaturated monomers.

11. The process according to claim 1, wherein the dispersion or emulsion includes up to 60% by weight additional unsaturated monomers.

12. The process according to claim 1, wherein the aldehyde reducing agent or its salt is at least 10% by weight soluble in water.

13. The process according to claim 2, wherein the dispersion or emulsion includes up to 70% of the additional monomer.

14. The process according to claim 2, wherein the dispersion or emulsion includes up to 60% of the additional monomer.

15. The process according to claim 3, wherein the dispersion or emulsion includes up to 70% of the additional monomer.

16. The process according to claim 3, wherein the dispersion or emulsion includes up to 60% of the additional monomer.

17. The process according to claim 1, wherein the oxidizing agent is selected from the group consisting of a salt of di-isopropylbenzenedihydroperoxide, a salt of pinane hydroperoxide, a salt of menthane hydroperoxide, and a salt of 2-(4-methylphenyl)propyl-2hydroperoxide.

18. The process according to claim 1, wherein the oxidizing agent is a salt of di-isopropylbenzenedihydroperoxide.

* * * * *